(12) United States Patent
Kawamoto et al.

(10) Patent No.: US 11,376,691 B2
(45) Date of Patent: *Jul. 5, 2022

(54) JOINT STRUCTURE

(71) Applicant: Panasonic Intellectual Property Management Co., Ltd., Osaka (JP)

(72) Inventors: Atsuhiro Kawamoto, Hyogo (JP); Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 685 days.

This patent is subject to a terminal disclaimer.

(21) Appl. No.: 16/088,599

(22) PCT Filed: Mar. 22, 2017

(86) PCT No.: PCT/JP2017/011302
§ 371 (c)(1),
(2) Date: Sep. 26, 2018

(87) PCT Pub. No.: WO2017/169998
PCT Pub. Date: Oct. 5, 2017

(65) Prior Publication Data
US 2020/0298339 A1   Sep. 24, 2020

(30) Foreign Application Priority Data
Mar. 30, 2016   (JP) .............................. JP2016-067193

(51) Int. Cl.
*B23K 26/21*   (2014.01)
*B23K 26/323*   (2014.01)
(Continued)

(52) U.S. Cl.
CPC ............ *B23K 26/21* (2015.10); *B23K 26/211* (2015.10); *B23K 26/24* (2013.01); *B23K 26/26* (2013.01);
(Continued)

(58) Field of Classification Search
CPC ............ B23K 2101/18; B23K 2103/20; B23K 2103/18; B23K 2103/22; B23K 2103/24;
(Continued)

(56) References Cited

U.S. PATENT DOCUMENTS

| 4,607,878 A | 8/1986 | Itoh |
| 4,682,002 A | 7/1987 | Delle Piane et al. |

(Continued)

FOREIGN PATENT DOCUMENTS

| EP | 2698224 | 2/2014 |
| JP | 53-137370 | 11/1978 |

(Continued)

OTHER PUBLICATIONS

Extended European Search Report dated Apr. 9, 2019 in related European Patent Application No. 17774539.5.
(Continued)

*Primary Examiner* — Michael E. La Villa
(74) *Attorney, Agent, or Firm* — Wenderoth, Lind & Ponack, L.L.P.

(57) ABSTRACT

A joint structure includes: a first same-type metal member; a second same-type metal member that can be mutually welded with the first same-type metal member; and a different-type member that has a penetrating portion, is interposed between the first same-type metal member and the second same-type metal member. In the plate thickness direction of an emission region in which a laser beam is emitted toward the penetrating portion, the plate thickness at the emission region of the first same-type metal member
(Continued)

positioned on the side on which the laser beam is emitted is a predetermined thickness corresponding to a first gap. The first same-type metal member and the second same-type metal member are fused and bonded together via the penetrating portion, and the different-type member is compressed and fixed, such that the different-type member is fixed to the first same-type metal member and the second same-type metal member.

8 Claims, 8 Drawing Sheets

(51) Int. Cl.
| | | |
|---|---|---|
| *B23K 26/324* | (2014.01) | |
| *B29C 65/64* | (2006.01) | |
| *B32B 15/01* | (2006.01) | |
| *F16B 5/08* | (2006.01) | |
| *B32B 15/04* | (2006.01) | |
| *B32B 5/02* | (2006.01) | |
| *B23K 26/211* | (2014.01) | |
| *B23K 26/26* | (2014.01) | |
| *B32B 3/26* | (2006.01) | |
| *B32B 15/18* | (2006.01) | |
| *B32B 3/14* | (2006.01) | |
| *B32B 3/08* | (2006.01) | |
| *B32B 5/00* | (2006.01) | |
| *B32B 15/08* | (2006.01) | |
| *B23K 26/24* | (2014.01) | |
| *B23K 33/00* | (2006.01) | |
| *B23K 103/20* | (2006.01) | |
| *B23K 101/18* | (2006.01) | |
| *B23K 103/24* | (2006.01) | |
| *B23K 103/18* | (2006.01) | |
| *B23K 103/22* | (2006.01) | |

(52) U.S. Cl.
CPC .......... *B23K 26/323* (2015.10); *B23K 26/324* (2013.01); *B23K 33/00* (2013.01); *B29C 65/64* (2013.01); *B32B 3/08* (2013.01); *B32B 3/14* (2013.01); *B32B 3/26* (2013.01); *B32B 5/00* (2013.01); *B32B 5/02* (2013.01); *B32B 15/012* (2013.01); *B32B 15/015* (2013.01); *B32B 15/017* (2013.01); *B32B 15/04* (2013.01); *B32B 15/043* (2013.01); *B32B 15/08* (2013.01); *B32B 15/18* (2013.01); *F16B 5/08* (2013.01); *B23K 2101/18* (2018.08); *B23K 2103/18* (2018.08); *B23K 2103/20* (2018.08); *B23K 2103/22* (2018.08); *B23K 2103/24* (2018.08); *B23K 2103/26* (2018.08); *Y10T 428/12347* (2015.01); *Y10T 428/12354* (2015.01); *Y10T 428/12361* (2015.01); *Y10T 428/12368* (2015.01); *Y10T 428/12375* (2015.01); *Y10T 428/12382* (2015.01); *Y10T 428/12389* (2015.01); *Y10T 428/12396* (2015.01); *Y10T 428/12493* (2015.01); *Y10T 428/12535* (2015.01); *Y10T 428/12556* (2015.01); *Y10T 428/12569* (2015.01); *Y10T 428/12986* (2015.01); *Y10T 428/2495* (2015.01); *Y10T 428/24959* (2015.01)

(58) Field of Classification Search
CPC .. B23K 2103/26; B23K 26/21; B23K 26/323; B23K 26/324; B23K 26/211; B23K 26/24; B23K 26/26; B23K 33/00; F16B 5/08; B32B 5/00; B32B 5/02; B32B 15/015; B32B 15/012; B32B 15/04; B32B 15/017; B32B 15/043; B32B 15/08; B32B 15/18; B32B 3/08; B32B 3/14; B32B 3/26; B29C 65/64; Y10T 428/12493; Y10T 428/12347; Y10T 428/12354; Y10T 428/12361; Y10T 428/12368; Y10T 428/12375; Y10T 428/12382; Y10T 428/12389; Y10T 428/12396; Y10T 428/12535; Y10T 428/12556; Y10T 428/12569; Y10T 428/12986; Y10T 428/2495; Y10T 428/24959
See application file for complete search history.

(56) References Cited

U.S. PATENT DOCUMENTS

| | | | |
|---|---|---|---|
| 2011/0052935 A1 | 3/2011 | Nakagawa et al. | |
| 2015/0001189 A1* | 1/2015 | Spinella | B21D 39/028 219/99 |
| 2016/0123362 A1 | 5/2016 | Iwase | |
| 2019/0047087 A1* | 2/2019 | Kawamoto | B23K 26/21 |
| 2019/0076962 A1* | 3/2019 | Kawamoto | B29C 65/16 |

FOREIGN PATENT DOCUMENTS

| | | |
|---|---|---|
| JP | 58-25889 | 2/1983 |
| JP | 60-1077 | 1/1985 |
| JP | 61-74793 | 4/1986 |
| JP | 6-7978 | 1/1994 |
| JP | 2004-42053 | 2/2004 |
| JP | 2008-6465 | 1/2008 |
| JP | 2014-226698 | 12/2014 |
| JP | 2015-42417 | 3/2015 |
| KR | 20110060057 | 6/2011 |

OTHER PUBLICATIONS

TWI: "A novel method for joining dissimilar materials—TWI", Oct. 31, 2007 (Oct. 31, 2007), XP055573876, Retrieved from the Internet: URL:https://www.twi-global.com/media-and-events/connect/2007/september-october-2007/a-novel-method-for-joining-dissimilar-materials [retrieved on Mar. 25, 2019].
Indian Examination Report dated Feb. 24, 2020 for the related Indian Patent Application No. 201847038985.
International Search Report dated Apr. 25, 2017 in corresponding International Application No. PCT/JP2017/011302.

* cited by examiner

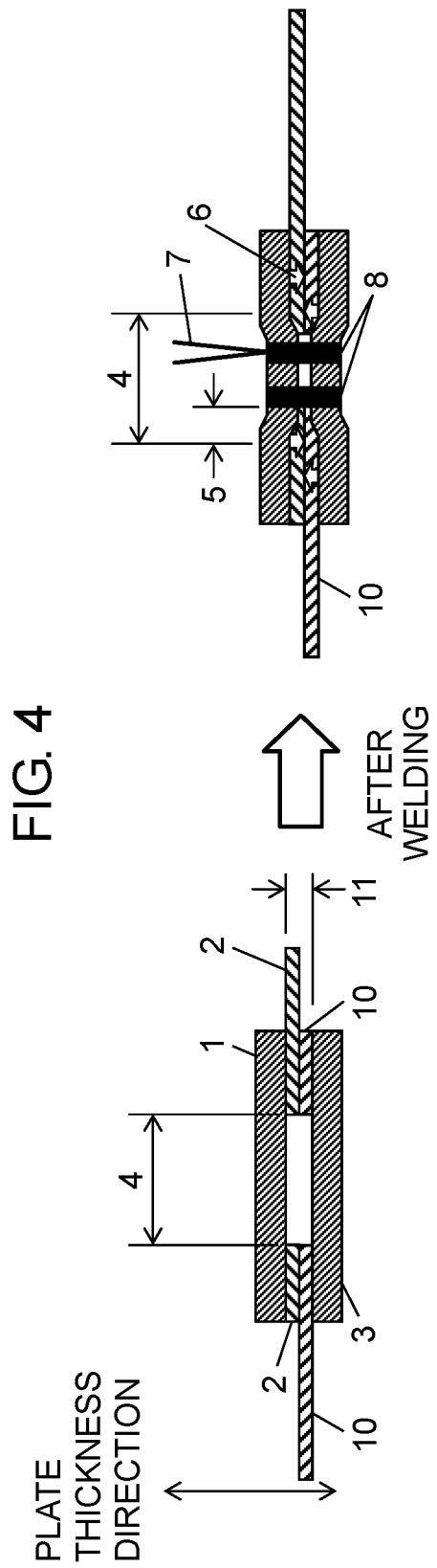

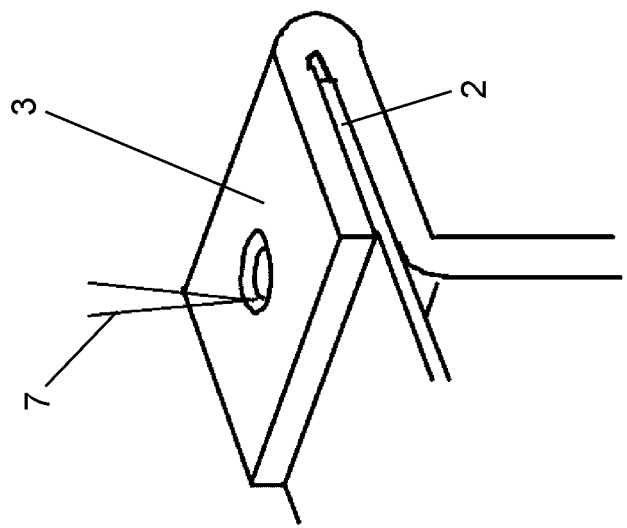
FIG. 5A DOUBLE FIXING STRUCTURE
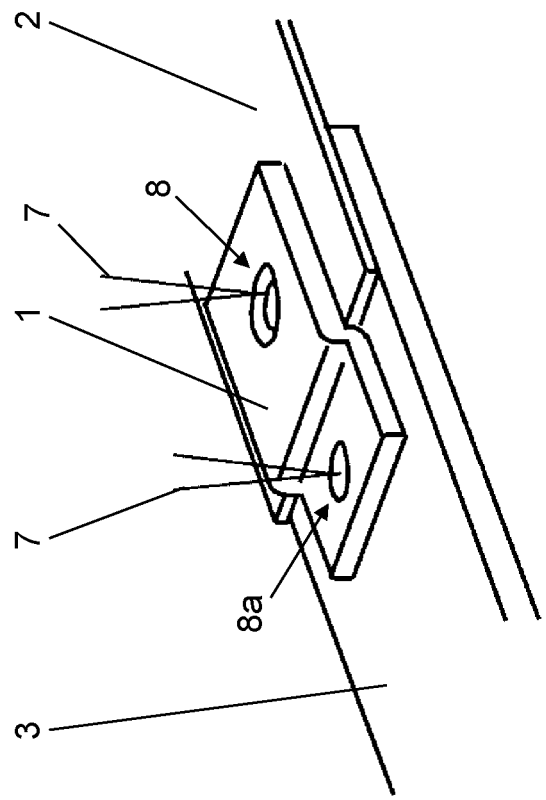
FIG. 5B FOLDING-BACK STRUCTURE

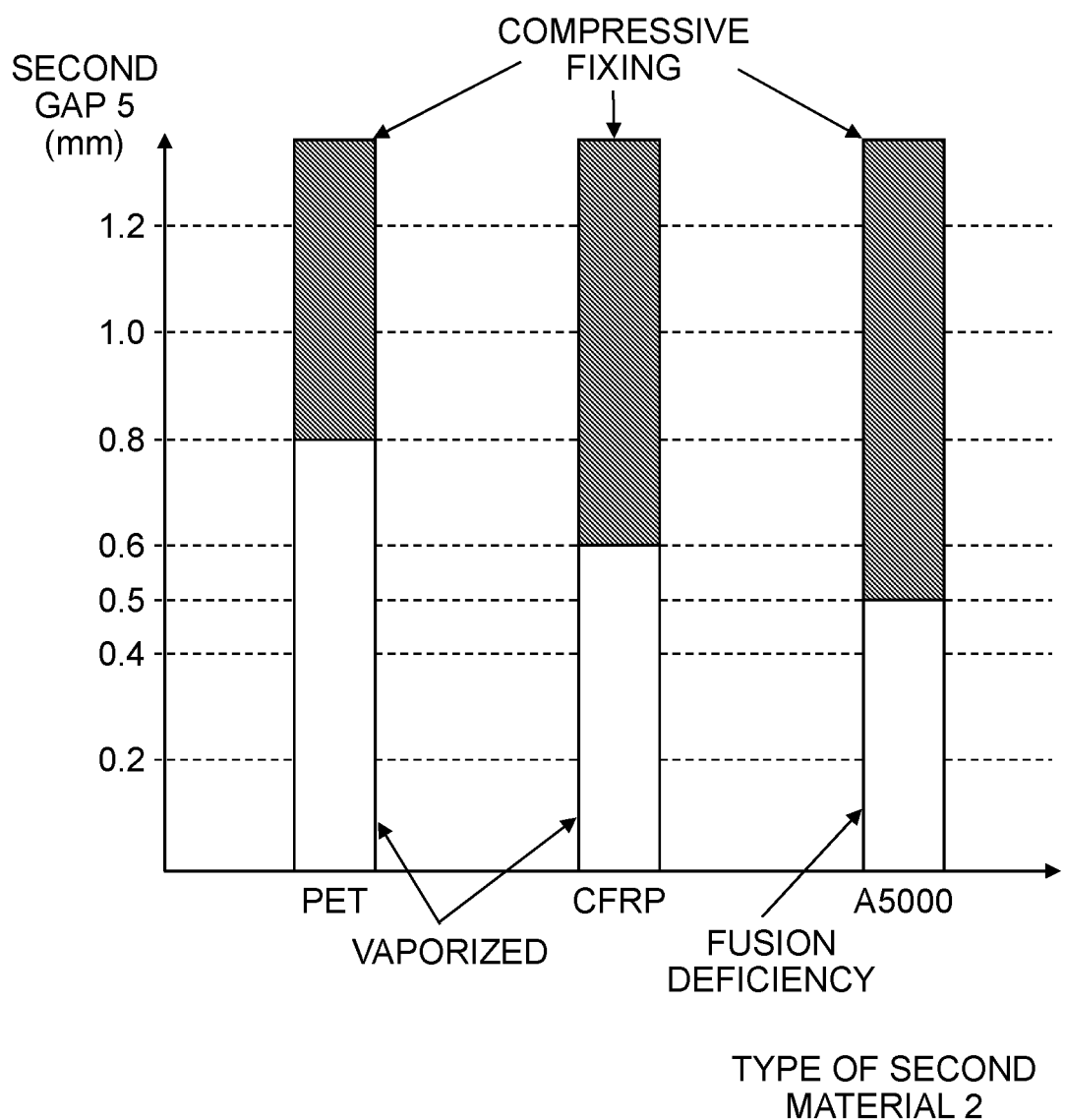

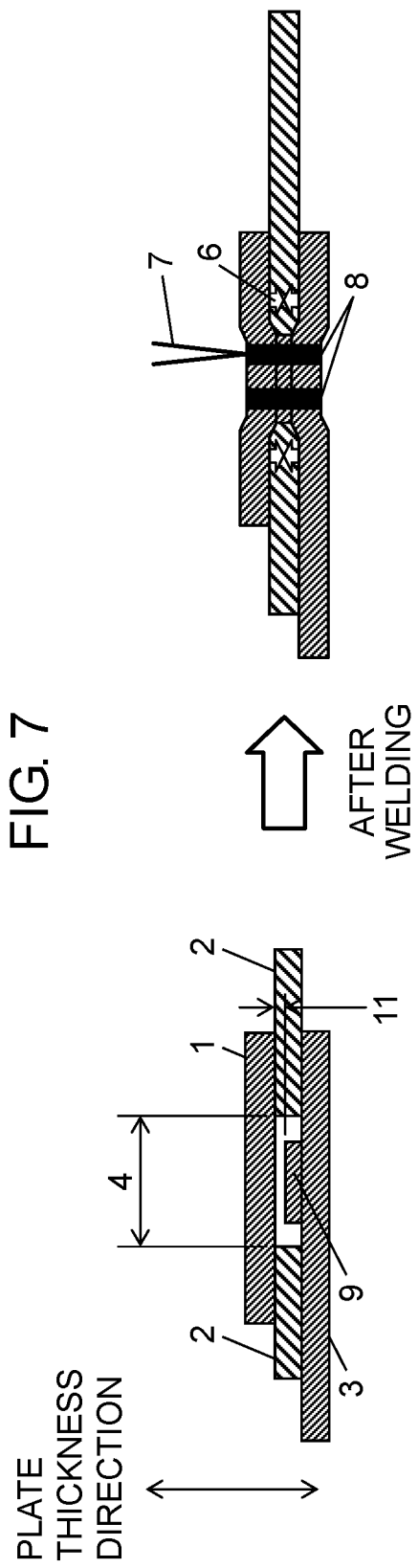

JOINT STRUCTURE

TECHNICAL FIELD

The present disclosure relates to a joint structure in which one-or-more different-type materials are fixed between same-type metal materials with application of laser light as a heat source.

BACKGROUND ART

Recent expansion of global transport of automobiles and other products has increased production volume of them. Under such a trend, there has been a growing demand for reduction of a total cost per product, particularly, for enhancing production efficiency by decreased production time.

At the same time, there has been a worldwide strong demand for constraint on carbon emissions to prevent global warming. To meet the demand, strenuous efforts on improvement of fuel efficiency are accelerating in transportation business including car industries. Decreasing weight of vehicles is a specific approach to improvement of fuel efficiency. Manufacturers are searching for using light-weight materials as possible.

As a welding method for transportation equipment including cars, a spot welding (i.e., a resistance welding) is widely employed. The spot welding has an upper electrode and a lower electrode as a welding gun for spot welding. Materials to be welded are tightly pressed between the upper electrode and the lower electrode and has application of current between the two electrodes. Therefore, the spot welding is not suitable for one-side welding and has limitations on shapes of material to be welded; the welding position of the material needs to be sandwiched between the welding gun for spot welding. Further, the welding gun needs a space on the upper and lower sides of the material to fit itself in and apply pressure to a welding position. Besides, due to heavy weight of the welding gun itself, the welding gun cannot move fast. After arriving the welding position, the welding gun needs pressure time for the material to be welded prior to welding. After welding, the welding gun needs to have cooling time for the welded material. That is, the spot welding needs lots of time other than the welding time.

As for weight saving of materials used for cars, manufacturers try to change a part of components from steel to light-metal material, such as aluminum. In such an effort, a technique and a structure suitable for connecting light-metal material with steel has been needed.

A spot welding using a rivet and a joining method using adhesives are conventionally used for connecting materials of different type. For example, Patent Literature 1 discloses a rivet shape, caulking, and a spot welding method capable of absorbing plastic flow that occurs in application of pressure on a different-type material between a rivet and a joint material similar to the material of the rivet and occurs in the different-type material caused by welding heat in spot welding. A different-type material often has a partial deformation in caulking and spot welding, and in other cases, such a different-type material sometimes has a depressed portion caused by a positional gap of the electrodes in spot welding. The structure disclosed in Patent Literature 1 addresses the problem above, maintaining joint strength so as not to have degradation.

CITATION LIST

Patent Literature

PTL 1: Japanese Unexamined Patent Application Publication No. 2015-42417

SUMMARY OF THE INVENTION

The joint structure of the present disclosure has a first material, a second material, which are same-type of metal and are weldable with each other, a different-type material that is difficult to weld to the first material and the second material. Having a penetrating part, the different-type material is sandwiched between the first material and the second material of same-type metal. In the plate thickness direction in which laser light is emitted toward an emission region in the penetrating part, the plate thickness at the emission region of the first material positioned on the side on which the laser light is emitted has a predetermined size so as to correspond to a first gap. The first gap is formed at the emission region in the plate thickness direction and exists before welding. The first material and the second material are fused and bonded together via the penetrating part, by which the different-type material is compressed and fixed. As a result, the different-type material is fixed to the first material and the second material of same-type metal.

BRIEF DESCRIPTION OF DRAWING

FIG. 4 illustrates an example of the joint structure in accordance with the first exemplary embodiment of the present disclosure.

FIG. 5A illustrates an example of the joint structure in accordance with the first exemplary embodiment of the present disclosure.

FIG. 5B illustrates an example of the joint structure in accordance with the first exemplary embodiment of the present disclosure.

FIG. 6 is a graph showing measurement data of relation of material of second material 2 and the size of second gap 5.

FIG. 7 illustrates the joint structure in accordance with a third exemplary embodiment of the present disclosure.

DESCRIPTION OF EMBODIMENT

Background to the Present Disclosure

Prior to the description of exemplary embodiments, the background to the present disclosure will be briefly explained.

Figure 8:
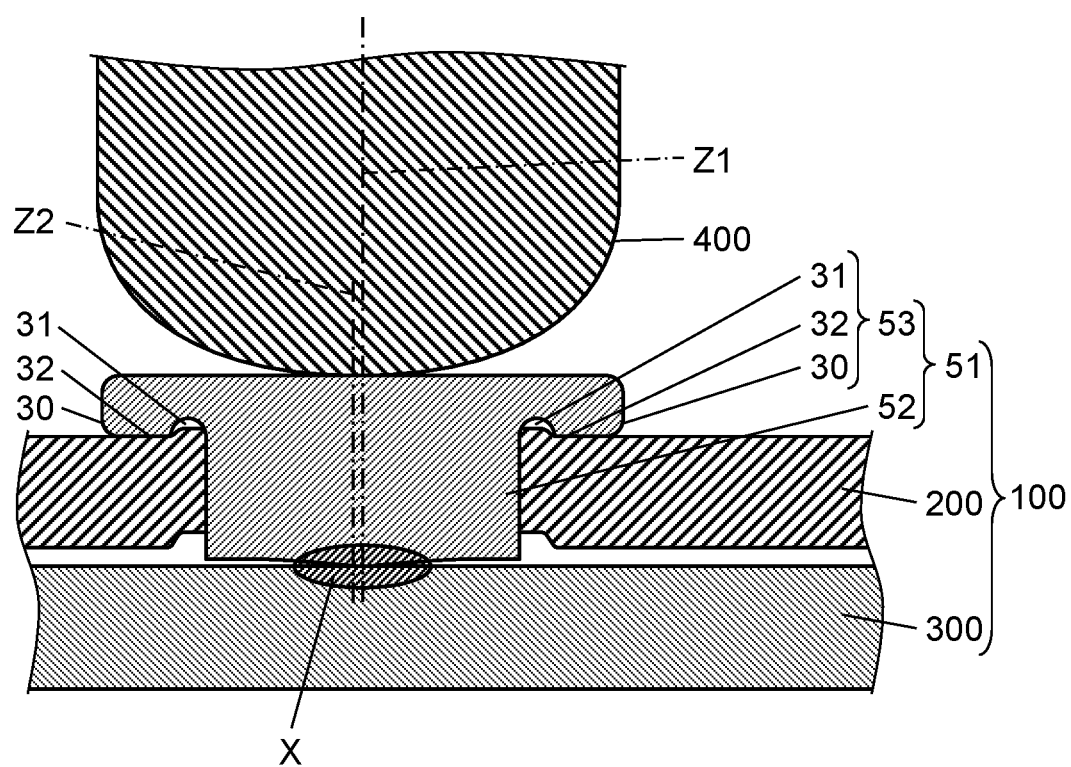
FIG. 8 illustrates a conventional joint state of different-type materials.

A conventional different-type joint material is described with reference to FIG. 8. If a part of different-type material 200 is deformed in caulking and spot welding, a space into which the deformed part moves has to be taken into account in designing a rivet. Further, if different-type material 200 has a depressed part due to, for example, a positional gap of the electrodes in spot welding, joint strength can be degraded. To deal with the problems, a rivet needs a complicated shape, such as chamfered edge 30 of an R (radius) shape and annular groove 31. That is, rivet 51 has to have a precision work, which increases production cost. Further, since the spot welding (i.e., the resistance welding) takes long time for applying pressure and current, for cooling, and for moving before/after welding, which prolongs the total working time. Besides, joining materials 100 are welded such that the welding gun (not shown) holds joining materials 100 therebetween, which lowers the degree of flexibility in design of joining materials 100.

In the resistance welding, molten metal is solidified into a weld nugget at a welding position. If a rivet disposed too close to an adjacent rivet, the welding current has a branch current, which fails sufficient nugget formation at an intended welding position. To obtain desired nugget formation with no branch current, a rivet has to be disposed with at least minimum joining pitch kept from an adjacent rivet. Due to the rivet arrangement with limitation in joining pitch, a conventional structure has often failed in increase in joint stiffness at an intended position.

The present disclosure provides a simple joint structure capable of joining different-type materials in laser welding, enhancing productivity.

First Exemplary Embodiment

The exemplary embodiment will be described with reference to FIG. 1 through FIG. 5B.

Figure 1:
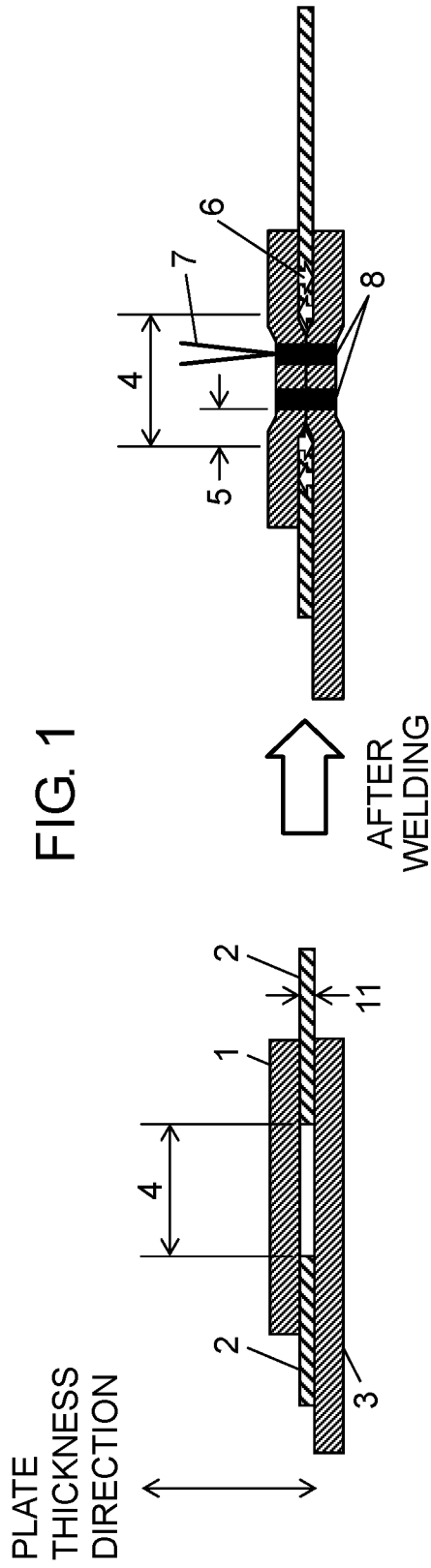
FIG. 1 illustrates the joint structure in accordance with a first exemplary embodiment of the present disclosure.
Figure 2:
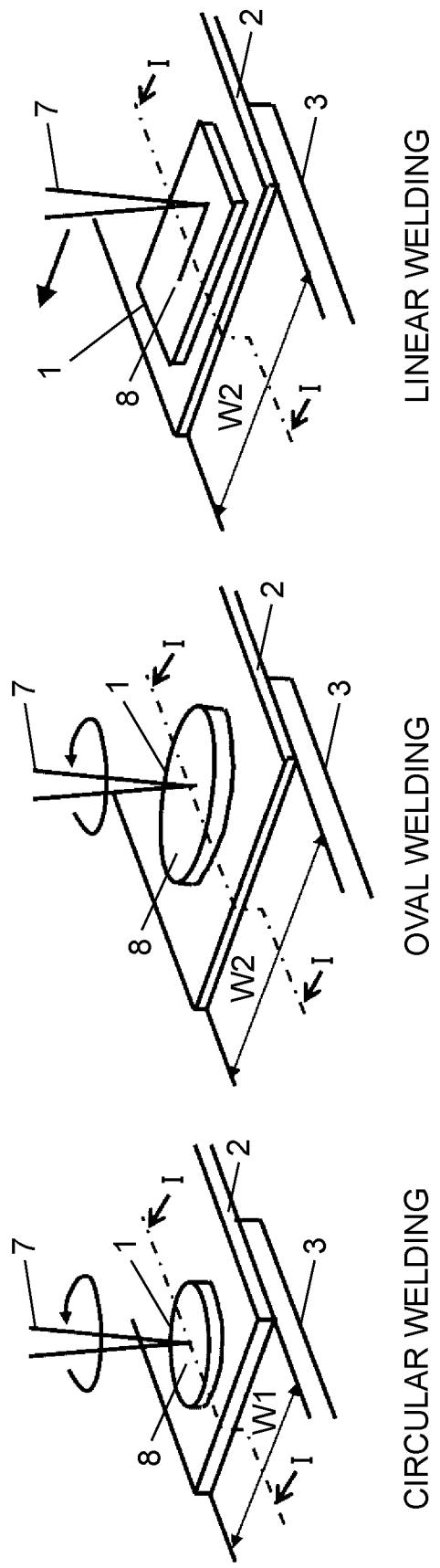
FIG. 2A illustrates a joint state in laser welding in accordance with the first exemplary embodiment of the present disclosure.
FIG. 2B illustrates a joint state in laser welding in accordance with the first exemplary embodiment of the present disclosure.
FIG. 2C illustrates a joint state in laser welding in accordance with the first exemplary embodiment of the present disclosure.

FIG. 1 illustrates the joint structure in accordance with the first exemplary embodiment. FIG. 2A through FIG. 2C illustrate a joint state in laser welding in accordance with the first exemplary embodiment.

Specifically, FIG. 2A illustrates a joint state where first material 1 of circular shape is used as the upper plate. FIG. 2B illustrates a joint state where first material 1 of oval shape is used as the upper plate. FIG. 2C illustrates a joint state where first material 1 of rectangular shape is used as the upper plate. Each of the cross sections taken along the line I-I in FIG. 2A through FIG. 2C corresponds to the cross section of FIG. 1.

FIG. 1 shows a joining state of first material 1, second material 2, and third material 3. First material 1 and third material 3 are made of metal of same type, and second material 2 is made of a different material. Second material 2 is sandwiched between first material 1 and third material 3. Each of first material 1, second material 2, and third material 3 is a plate material having a substantially uniform thickness.

As an example of the penetrating part of the structure in the present disclosure, through-hole 4 is formed in second material 2 in advance. Through-hole 4 forms a gap between first material 1 and third material 3. In the state where second material 2 is sandwiched between first material 1 and third material 3, no holes, projections, bumps are disposed in the gap formed by through-hole 4. That is, the plate thickness of second material 2 substantially equals to first gap 11 between first material 1 and third material 3 in the plate thickness direction. Although the structure of the embodiment has through-hole 4 as an example of the penetrating part, it is not limited to; the penetrating part may be a penetrating groove.

The plate thickness direction mentioned above is the direction shown by the arrow in FIG. 1, which is perpendicular to the principal surface of first material 1, second material 2, and third material 3 in a state before welding.

The metal materials of same type mean the metals that are weldable with each other. It is not necessarily to be exactly the same; for example, a combination of ferrous metals or a combination of nonferrous metals may be employed, as long as they have a good affinity in welding. For example, the followings are the specific example of a combination of welding materials: as for ferrous-metal combinations of first material 1 and third material 3, mild steel and mild steel; mild steel and stainless steel; stainless steel and stainless steel; mild steel and high-tensile steel; high-tensile steel and stainless steel; high-tensile steel and high-tensile steel, and as for nonferrous-metal combinations, aluminum and aluminum; aluminum and aluminum alloy; aluminum alloy and aluminum alloy.

Different-type second material 2, which differs in material from first material 1 and third material 3 of same-type metal, is difficult to be welded to the same-type metal material. For example, when ferrous-metal material is chosen for first material 1 and third material 3 of same-type metal material, non-ferrous metal, such as copper and aluminum, is employed for different-type second material 2. When metal material is chosen for first material 1 and third material 3, resin material, such as CFRP (carbon fiber reinforced plastics) and PET (polyethylene terephthalate) is employed for different-type second material 2.

As shown in a welding state of FIG. 2A, laser light 7 is emitted from the upper side of first material 1 in the plate thickness direction. At that time, the emission effective range of laser light 7 (i.e., the weldable range) is the inside of through-hole 4 (see FIG. 1) of second material 2. Laser light 7 is circularly applied toward the inside of through-hole 4, by which a weld bead is formed as weld part 8 shown in FIG. 1. When laser light 7 is incident to first material 1, in the description, first material 1 and third material 3 correspond to a first material and second material, respectively, of same-type metal of the present disclosure.

Next, the joining state in and after welding is described with reference to FIG. 1. As described above, laser light 7 is circularly emitted from the upper side of first material 1 and third material 3 so as to be aimed to the inside of through-hole 4 as the incident region of laser light 7. Weld part 8 is formed by applying laser light, and at that time, molten metal of first material 1 and third material 3 solidifies and shrinks at weld part 8. At the same time, compression force 6 acts on different-type second material 2 sandwiched between first material 1 and third material 3 of same-type metal material. First gap 11, as described earlier, is a space formed between first material 1 and third material 3 in the plate thickness direction along a plate thickness in the incident region of laser light 7. The length of first gap 11, which corresponds to the thickness of second material 2, is compressed by compression force 6.

When the length of first gap 11 (i.e., the plate thickness of second material 2) is determined to be not less than 6% and not more than 38% of the plate thickness in the incident region of laser light 7 of first material 1 (as the upper plate with respect to the direction of laser emission) or of third material 3 (as the lower plate with respect to the direction of laser emission), the solidification and shrinkage of weld part 8 acts as compression force 6 on second material 2. As a result, second material 2 is tightly compressed between first material 1 and third material 3.

Figure 3:
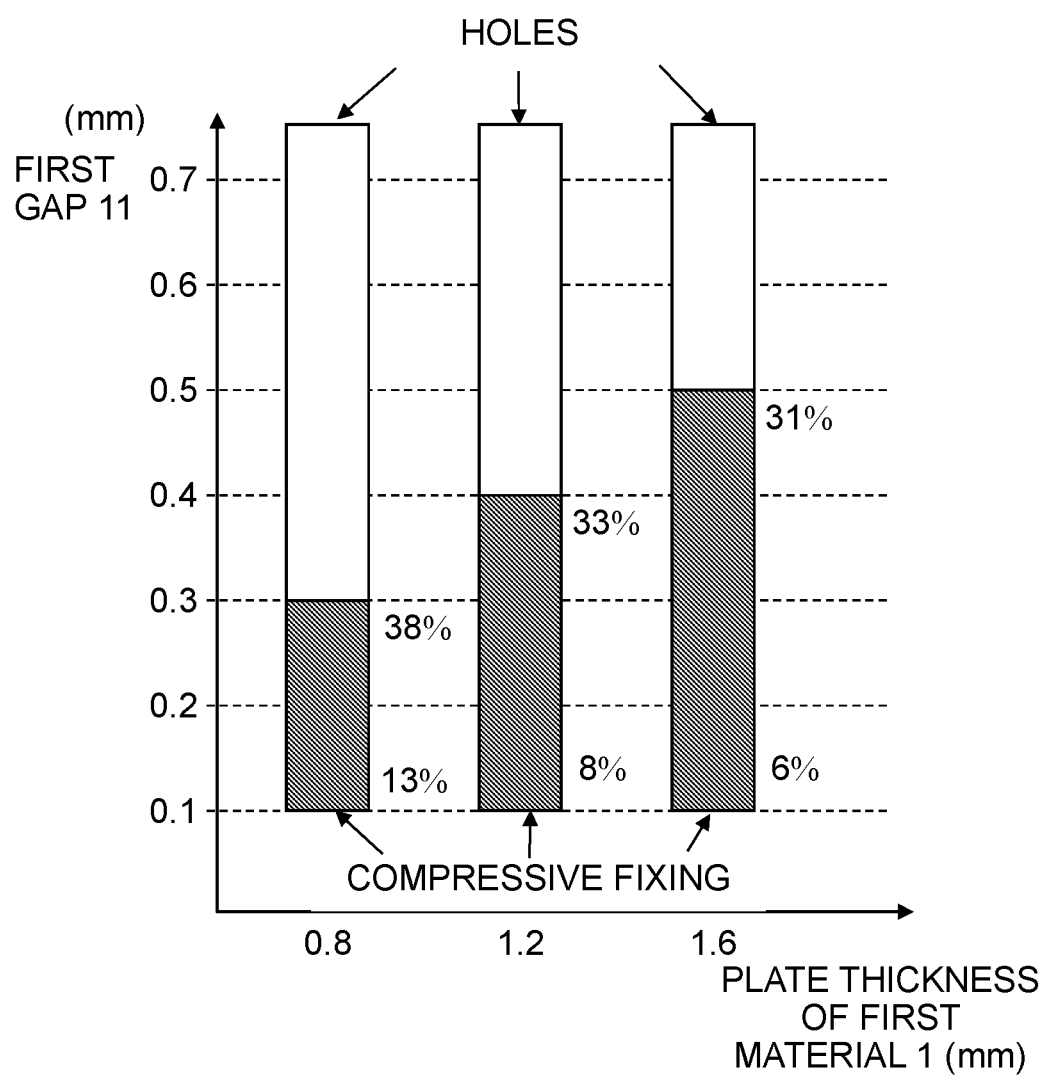
FIG. 3 is a graph showing relation of the plate thickness of first material 1 and second material 2 (corresponding to the size of first gap 11) at the emission region in which laser light 7 is incident and first gap 11 as the space in the plate thickness direction.

The determination of not less than 6% and not more than 38% the percentage of the size of first gap 11 corresponding to the plate thickness of second material 2 to the plate thickness of first material 1 (or third material 3)—is obtained from experimental data. FIG. 3 shows an example of the experimental data. FIG. 3 is a graph of measurement data showing the relation of the plate thickness of first material 1 (as the upper plate with respect to the direction of laser emission) and the length of first gap 11 (i.e., the plate thickness of different-type second material 2 between first material 1 and third material 3 of same-type metal material).

FIG. 3 is a graph of measurement data showing the relation of the plate thickness of first material 1 and the length of first gap 11 that is a space in the incident region of laser light 7 in the plate thickness direction and corresponds to the plate thickness of second material 2.

In the measurement shown in FIG. 3, mild steel was employed for first material 1 and third material 3, and PET as a resin material was employed for second material 2. In the material combination above, first material 1 was disposed above third material 3, and second material 2 was disposed between the same-type metal materials. Laser light 7 was circularly emitted from above the stacked materials toward the incident region (i.e., the inside of through-hole 4 of second material 2). The laser output in the experiment was 3 kW.

For example, through-hole 4 as a penetrating part of second material 2 was determined to 12 mm. Laser light 7 was circularly incident in the plate thickness direction to the incident region of weld part 8 so that the incident region is smaller than through-hole 4, keeping a distance from the outer edge of the diameter or the width of it. Specifically, the outer size of weld bead of weld part 8 was 8 mm.

For example, when first material 1 has a plate thickness of 0.8 mm, the effective range of the plate thickness of second material 2 (as first gap 11 that is a space between first material 1 and third material 3 in the plate thickness direction) for preferably compressed fixing (brought by solidification and shrinkage effect of molten metal at weld part 8) is 0.1 mm to 0.3 mm. The plate thickness of second material 2 greater than 0.3 mm causes a partial deficiency in a weld line, such as holes (At least one opening holes formed in the weld due to insufficient filling of molten metal during welding), resulting in poor weld. The experiment shows that the effective plate thickness of second material 2 is 13%-38% of the plate thickness of first material 1.

Further, when first material 1 has a plate thickness of 1.6 mm, the effective range of the plate thickness of second material 2 for preferably compressed fixing (brought by solidification and shrinkage effect of molten metal at weld part 8) is 0.1 mm to 0.5 mm. The plate thickness of second material 2 greater than 0.5 mm causes a partial deficiency in a weld line, such as holes (At least one opening holes formed in the weld due to insufficient filling of molten metal during welding), resulting in poor weld. That is, the compressive fixing range by welding is determined by appropriate relation of plate thickness of different-type second material 2 to first material 1 of same-type metal material on the side of laser incident.

In other words, the experiment result shows that, when molten metal corresponding to 31%-38% of the maximum plate thickness of first material 1 falls into the inside of through-hole 4, the joining work is successfully carried out without a defective part, such as holes. If the plate thickness of second material 2 becomes greater than 31%-38% of the maximum plate thickness of first material 1, an amount of molten metal necessary for filling up the inside of through-hole 4 cannot be obtained, which causes a defective state, such as making holes.

In contrast, when the plate thickness of second material 2 (that corresponds to the length of first gap 11 as a space in the plate thickness direction) is smaller than 0.1 mm, first material 1 is too close to third material 3, and the same-type metal materials fuse together. This causes lack of compression force 6 on different-type second material 2.

As described above, insofar as an enough amount of molten metal in welding is obtained, i.e., insofar as having no holes, the greater first gap 11 (as a space in the plate thickness direction), the greater the solidification and shrinkage effect of molten metal at weld part 8 by incident of laser light 7. The increase in solidification and shrinkage enhances compression force 6 (as the fixing force by first material 1 and third material 3) that acts on second material 2.

According to the embodiment, laser light 7 is emitted from the side on which first material 1 is disposed. When first gap 11 (as the plate thickness of second material 2) is determined to 6%-38% of first material 1 or third material 3, first gap 11 is filled with a sufficient amount of molten metal in welding; accordingly, the solidification and shrinkage effect of weld part 8 allows second material 2 between first material 1 and third material 3 to be fixed with compression force. The laser light may be emitted from the side of third material 3, not from the side of first material 1. In that case, the first material and the second material of same-type metal of the present disclosure correspond to third material 3 and first material 1, respectively.

Besides, in the description, first material 1 and third material 3 are same-type metal materials and mild steel is employed for the above, but they are not limited to, as long as they are weldable with each other with sufficient joining strength. The followings are ferrous-metal combination examples of first material 1 and third material 3 of same-type metal material: mild steel and mild steel; stainless steel and stainless steel; high-tensile steel and high-tensile steel; mild steel and high-tensile steel; and high-tensile steel and stainless steel. As for a nonferrous-metal combination, the followings are employed: aluminum and aluminum; aluminum alloy and aluminum alloy; aluminum and aluminum alloy. They are weldable materials by laser.

In contrast, second material 2 is a material that is difficult to be welded due to poor absorptivity of laser light, such as copper and resin material, or a material having poor affinity in welding connection with first material 1 and third material 3. For example, a specific combination of same-type materials 1,3 and second material 2 is mild steel (as first material 1 and third material 3) and aluminum (second material 2) and vice versa.

As described above, when the plate thickness of second material 2 sandwiched between first material 1 and third material 3 is determined to be not less than 6% and not more than 38% of the plate thickness of first material 1 (disposed on the laser emission side) and third material 3, preferable compressive fixing in welding is obtained. In other words, when the plate thickness of first material 1 and third material 3 is determined to be not less than 250% and not more than 1600% of the first gap 11 (i.e., the plate thickness of second material 2 of different-type), preferable compressive fixing in welding is obtained. In this way, determining the plate thickness of joining materials to be in the effective range for compressive fixing allows the same-type metal materials to be fused together, providing the different-type material with compressive fixing.

Example

FIG. 4 shows a joining example in which second material 2 and fourth material 10 both are different in material from one another are sandwiched between first material 1 and third material 3 of same-type material. In that case, the total plate thickness of second material 2 and fourth material 10 corresponds to first gap 11. Prior to welding, the gap length of first gap 11 is appropriately determined.

For example, in the incident region in which laser light 7 is incident, when the gap length of first gap 11 is determined to be not less than 6% and not more than 38% of the plate thickness of first material 1 as the upper plate, the solidification and shrinkage effect of weld part 8 allows second material 2 and fourth material 10 between first material 1 and third material 3 to be fixed with compression force. Particularly, it will be effective joining when resin such as PET, or nonmetal material such as CFRP are employed for second material 2 and fourth material 10 as different materials from one another. Such a material tends to exhibit high transmittance for laser light 7 and is difficult to be directly welded with a material of different type.

FIG. 2A shows an example in which first material 1 has a circular shape, FIG. 2B and FIG. 2C show examples in which first material 1 has other shapes. In FIG. 2B, the scanning trace of laser light 7 as a weld form (not shown), seen from above, has an oval shape. Width W2 of second material 2 and third material 3 shown in FIG. 2B is greater than width W1 shown FIG. 2A. In the state of FIG. 2B, the weld strength that weld part 8 needs in welding with emission of laser light 7 particularly acts in a certain direction, the major axis of oval first material 1 should be disposed along the direction, i.e., along width W2 of second material 2 and third material 3. Employing an oval shape for first material 1 eliminates the need for forming it into a large circular shape, reducing the area of first material 1.

Further, as shown in FIG. 2C, employing a linear weld form allows first material 1 to have a rectangular shape, not a large circular shape, reducing the area of first material 1. Further, forming the scanning trace of laser light 7 into one or more lines makes the scanning trace of welding simple. Compared to laser scanning with a circular or an oval shape carried out repeatedly for several times, it shortens welding time.

FIG. 5A and FIG. 5B show an example for enhancing welding strength and for making positioning easy.

In FIG. 5A, first material 1 has the function for positioning second material 2 in the joining process of third material 3 and second material 2. Specifically, second material 2 of different type is sandwiched between first material 1 having a stepped part and third material 3 such that second material 2 has abutment against the stepped part of first material 1. This makes positioning of second material 2 easy.

Besides, the joint structure of FIG. 5A enhances tensile strength of the joint section. To be specific, first material 1 is connected to third material 3 via second material 2 at weld part 8; at the same time, first material 1 is directly connected with third material 3, i.e., having no second material 2 therebetween at weld part 8a. By virtue of the structure welded at two positions, when third material 3 undergoes tensile force from second material 2 or torsion from outside, the stress is shared by weld part 8 and weld part 8a. The structure prevents weld part 8—at which first material 1 is connected to third material 3 via second material 2—from concentration of the stress. That is, the joint structure as a whole enhances joining strength between the same-type metal materials and the different-type material.

FIG. 5B shows third material 3 having a folding-back structure. Such structured third material 3 doubles as first material 1, forming a one-piece structure with no use of first material 1 as the upper plate. Second material 2 is inserted in third material 3 until having abutment against the folding-back section. The structure makes positioning of second material 2 easy.

In FIG. 5B, the upper-plate section of third material 3 with a folding-back structure corresponds to the first material of the present disclosure, and the lower-plate section of third material 3 with a folding-back structure corresponds to the second material of the present disclosure. That is, the first material and the second material may be a one-piece structure of same-type metal before welding.

As described above, the joint structure to be welded by laser light 7 of the embodiment has a first material, a second material, which are same-type metal and weldable with each other, and a different-type material disposed between the first material and the second material of same-type metal. The different-type material has through-hole 4 as an example of penetrating part. The different-type material is difficult to be welded to the first material and the second material of same-type metal.

The structure allows first material 1 and third material 3 of same-type metal to be fused and bonded together, providing different-type second material 2 with compressive fixing.

Second Exemplary Embodiment

Next, the structure of the second exemplary embodiment is described with reference to FIG. 1 and FIG. 6.

The region on which laser light 7 is incident in the plate thickness direction has a predetermined distance from the edge of through-hole 4 of second material 2, that is, the region has second gap 5 as the distance between the edge of through-hole 4 and the outer periphery of weld part 8.

The outer size of weld part 8 corresponds to that of the region on which laser light 7 is incident.

With the incident of laser light 7 to the region, second material 2 receives welding heat input from weld part 8. At that time, the positional relation of second material 2 and second gap 5 largely affects fusion of second material 2.

With the incident of laser light 7, weld part 8 of first material 1 and third material 3 of same-type metal receives welding heat input. When second gap 5 is properly positioned with respect to through-hole 4, different-type second material 2 fuses by indirect influence of the welding heat input and flows into second gap 5 formed between the edge of through-hole 4 of second material 2 and the outer periphery of weld part 8. That is, in the laser light incident of welding, different-type second material 2 is indirectly heated and fused by the welding heat input transferred from first material 1. The fused second material 2 flows to the outer edge of weld part 8—at which first material 1 and third material 3 (corresponding to the first material and the second material, respectively, of same-type metal) are fused and bonded together—and is tightly fixed to the outer edge of weld part 8. As described above, the structure offers tightly-bonded surface connection of first material 1, third material 3, and second material 2, in addition to compressive fixing by solidification and shrinkage effect of weld part 8.

When second gap 5 has a short distance from the edge of through-hole 4, welding heat of weld part 8 fed from laser light directly or indirectly influences through-hole 4 of second material 2.

Receiving the influence of welding heat input, fused second material 2 flows into a space of weld part 8 of first material 1 and third material 3. If second material 2 is a material with a low boiling point such as resin, vaporized resin material can spout from the space, resulting in poor weld. In contrast, when second gap 5 has a long distance from the edge of through-hole 4, second material 2 has no fusion. Such a structure obtains only compressive fixing by solidification and shrinkage effect.

The relation of second gap 5 and melting condition of second material 2 by the heat effect of first material 1 and third material 3 depends on the material of second material 2.

FIG. 6 shows an example of experiment data. FIG. 6 shows measurement result showing the relation of the material of second material 2 and second gap 5.

FIG. 6 is a graph of measurement data showing the relation of second gap 5 and the material of different-type second material 2 of the embodiment of the present disclosure.

The graph shows measurement data of the following materials employed for second material 2: PET (polyethylene terephthalate) and CFRP (carbon fiber reinforced plastics) as resin material; A5000-series aluminum alloy as nonferrous metal.

In the measurement, a mild-steel material with a plate thickness of 1.6 mm was employed for first material 1 and third material 3. As for different-type second material 2, one of the aforementioned three materials with a plate thickness of 0.4 mm was sandwiched between first material 1 and third material 3. The diameter of through-hole 4 of second material 2 was 12 mm. In welding, laser emission with laser output of 3 kW was applied to the structure so as to have a weld form of a circular shape. First gap 11, which equals to the plate thickness of second material 2, was 0.4 mm.

The description below is on second material 2 formed of PET as a resin material. When second gap 5 is not less than 0.8 mm, i.e., second gap 5 is not less than 200% of first gap 11, compressive fixing of second material 2 is obtained. Even under the welding heat input effect, a space of weld part 8 of first material 1 and third material 3 has no flow-in of melted second material 2 and has no poor weld.

However, second gap 5 determined to be smaller than 0.8 mm, i.e., determined to be smaller than 200% of first gap 11 often invited poor weld. That is, when weld part 8 at which laser light 7 is incident has outer periphery close to the edge of through-hole 4, second material 2 fuses by receiving the influence of welding heat input and flows into a space of weld part 8 of first material 1 and third material 3. With the welding heat, melted and vaporized second material 2 can spout from the space, resulting in poor weld.

The description below is on the case in which a CFRP material (which is a fiber-reinforced resin in resin material) was employed for second material 2. When second gap 5 is not less than 0.6 mm, i.e., second gap 5 is not less than 150% of first gap 11, compressive fixing of second material 2 is obtained. Even under the welding heat input effect, a space of weld part 8 of first material 1 and third material 3 has no flow-in of melted second material 2 and has no poor weld.

However, second gap 5 determined to be smaller than 0.6 mm, i.e., determined to be smaller than 150% of first gap 11 can invite poor weld. That is, when weld part 8 at which laser light 7 is incident has outer periphery close to the edge of through-hole 4, second material 2 fuses by receiving the influence of welding heat input and flows into a space of weld part 8 of first material 1 and third material 3. With the welding heat, melted and vaporized second material 2 can spout from the space, resulting in poor weld. As shown by the measurement result, when a resin material is employed for different-type second material 2 sandwiched between the same-type metal materials, the properties of the resin material, such as a boiling point and a melting point, largely affect the allowable size of second gap 5 in welding.

Next, the description below is on the case in which A5000-series aluminum alloy material (as an example of nonferrous metal) was employed for second material 2. When second gap 5 is not less than 0.5 mm, i.e., second gap 5 is not less than 125% of first gap 11, compressive fixing of second material 2 is obtained. Even under the welding heat input effect, a space of weld part 8 of first material 1 and third material 3 has no flow-in of melted second material 2 and has no poor weld.

However, when second gap 5 is smaller than 0.5 mm, i.e., smaller than 125% of first gap 11, second material 2 fuses by receiving the influence of welding heat input and flows into a space of weld part 8 of first material 1 and third material 3, resulting in poor weld. The measurement data shows that poor weld depends on materials property.

The experiment data described above shows an example when the aforementioned different materials were employed for second material 2. The allowable size of second gap 5 obtained in the case of the PET material tends to be similar to other resin materials. Similarly, the allowable size of second gap 5 obtained in the case of the CFRP material and in the case of the A5000-series aluminum alloy tends to be similar to other fiber-reinforce resins and other nonferrous metal, respectively. That is, when second gap 5 is smaller than the allowable size; specifically, when it is smaller than 0.5 mm (i.e., smaller than 125% of first gap 11), poor weld may be the result. This is also almost true for other nonferrous metal.

Third Exemplary Embodiment

Next, the structure of the third exemplary embodiment is described with reference to FIG. 7. A description overlapped with that mentioned above will be omitted. The structure of the exemplary embodiment differs from that of the first exemplary embodiment in that spacer 9 is disposed in through-hole 4. When second material 2 (disposed between first material 1 and third material 3) has a large plate thickness, spacer 9 is disposed in the inside of through-hole 4 of second material 2. Spacer 9 is a material of a metal similar to first material 1 and third material 3 and therefore weldable to them. Having spacer 9 in through-hole 4 contributes to decrease in size of first gap 11 that is the space formed in the plate thickness direction of first material 1 and third material 3.

The plate thickness of spacer 9 is determined such that the size of first gap 11 (when spacer 9 is disposed between first material 1 and third material 3 in through-hole 4) corresponds to 6%-38% of the plate thickness of first material 1 as the upper plate on which laser light 7 is incident. Spacer 9 is not necessarily additionally-disposed component; it may be formed between first material 1 and third material 3 by using welding materials, such as a filler and a consumable electrode.

In this case, too, like in the first and the second embodiments, the size of first gap 11 is determined to be in a predetermined range (see FIG. 3) suitable for the plate thickness of first material 1 and third material 3 of same-type material, and keyhole laser welding is carried out so as to penetrate third material 3 as the lower plate. In this way, the solidification and shrinkage effect of weld part 8 enhances compression force 6, providing second material 2 with compressive fixing.

If the first gap 11 becomes greater than 31%-38% of the maximum plate thickness of first material 1, an amount of molten metal necessary for filling up first gap 11 cannot be obtained, which causes a defective state, such as making holes.

In contrast, when first gap 11 (as a space in the plate thickness direction) is smaller than 0.1 mm, first material 1 is too close to third material 3, and first material 1 and third material 3 of same-type metal fuse together. This causes lack of compression force 6 on different-type second material 2.

In the description of the embodiment, laser light 7 is emitted from the side of first material 1 as the upper plate with respect to the direction of laser emission, but it is not limited to; the laser light may be emitted from the side of third material 3 as the lower plate. In that case, third material 3 and first material 1 correspond to first material 1 and second material 2, respectively, of same-type metal of the present disclosure.

[Summary]

In welding, a rivet is used for connecting a different-type material. When a part of the different-type material is deformed in caulking and spot welding, a space into which the deformed part moves has to be taken into account in designing rivets. Further, when the different-type material has a depressed part due to, for example, a positional gap of the electrodes in spot welding, joint strength can be degraded. To deal with the problems, a conventional rivet has needed a complicated shape, such as a chamfered edge of an R shape and an annular groove.

A rivet therefore has to be formed into a complicated shape with precision. That is, a rivet has to have a precision work, which increases production cost. Further, since the spot welding takes long time for applying pressure and current, for cooling, and for moving before/after welding, which decreases productivity. Besides, joining materials are welded such that a welding gun holds the joining materials therebetween, which lowers the degree of flexibility in design of the joining materials. In the resistance welding, molten metal is solidified into a weld nugget at a welding position. If a rivet disposed too close to an adjacent rivet, the welding current has a branch current, which fails sufficient nugget formation at an intended welding position. To obtain desired nugget formation with no branch current, a rivet has to be disposed with at least minimum joining pitch kept from an adjacent rivet. Due to the rivet arrangement with limitation in joining pitch, a conventional structure fails in increase in joint stiffness at an intended position. The structure of the present disclosure addresses the problems above.

As described above, the joint structure of the present disclosure has a first material, a second material, which are same-type metal materials and are weldable with each other, and a different-type material that is difficult to be welded to the first material and the second material. Having through-hole 4 as a penetrating part, the different-type material is to be sandwiched between the first material and the second material of same-type metal. In the plate thickness direction of an incident region in which laser light 7 is incident toward the penetrating part, the plate thickness at the incident region of the first material positioned on the side on which laser light 7 is incident has a predetermined size so as to be suitable for first gap 11. First gap 11 is formed at the incident region in the plate thickness direction and exists before welding.

When laser light is incident to the incident region, the first material and the second material of same-type metal are fused and bonded together via through-hole 4, by which the different-type material is compressively fixed to the first material and the second material of same-type metal.

Employing the joint structure eliminates a component that has to be formed with a high degree of precision due to its complicated structure. Besides, the joint structure is processed by laser welding, not spot welding. The process by laser welding allows the working time including welding to decrease to about 25% of the process by spot welding, significantly improving productivity. Further, the structure increases joint stiffness at an intended position, enhancing the degree of flexibility in design of joining materials.

First gap 11 may have a size corresponding to the length of through-hole 4 in the plate thickness direction in the incident region.

The length of first gap 11 in the incident region may be determined to be not less than 6% and not more than 38% of the thickness of the first material in the incident region.

The incident region in which laser light 7 is incident in the plate thickness direction may be formed small, having second gap 5 at a predetermined position with respect to through-hole 4.

Different-type material 2 may flow onto the outer edge of weld part 8 at which the first material and the second material of same-type metal are fused and bonded together.

When a resin material is employed for the different-type material, the length of second gap 5 may be determined to be not less than 200% of that of first gap 11.

When a fiber-reinforced resin material is employed for the different-type material, the length of second gap 5 may be determined to be not less than 150% of that of first gap 11.

When nonferrous metal is employed for the different-type material, the length of second gap 5 may be determined to be not less than 125% of that of first gap 11.

Spacer 9 formed of a material that is weldable to first material and second material of same-type metal may be disposed in through-hole 4 of the different-type material.

INDUSTRIAL APPLICABILITY

The joint structure is suitable for connecting different-type materials. Having a simple structure, the joint structure significantly decreases production take time and increases stiffness at a position that needs it. Further, the structure allows joining material to have increased flexibility in design. As described above, the structure has high industrial applicability as a joint structure for laser welding.

REFERENCE MARKS IN THE DRAWINGS

1 first material (first same-type metal material)
2 second material (different-type material)
3 third material (second same-type meal material)
4 through-hole (penetrating part)
5 second gap
6 compression force
7 laser light
8, 8a weld part
9 spacer
10 fourth material (different-type material)
11 first gap

The invention claimed is:
1. A joint structure comprising:
a first material of metal;

a second material of metal weldable to the first material; and a different material including a penetrating part, the different material being sandwiched between the first material and the second material, the different material being different from the first material and the second material and being difficult to weld to the first material and the second material, wherein the different material is compressed between the first material and the second material and is fixed to the first material and second material, and the first material is bonded to the second material via the penetrating part by fusion bonding that is caused by laser light which is incident to the first material under conditions in which:

(i) the first material is disposed on a side on which the laser light is incident in a plate thickness direction of an incident region of the first material, the incident region being a region in which the laser light emitted toward the penetrating part is incident;

(ii) a first gap is provided between the first material and the second material in the plate thickness direction before welding; and (iii) the first gap having a length in the plate thickness direction, the length of the first gap being determined in relation to a plate thickness of the first material, wherein the length of the first gap in the incident region is not less than 6% and not more than 38% of the plate thickness of the first material in the incident region, and wherein the different material flows and clings to an outer edge of a weld part at which the first material and the second material are fused and bonded together.

2. The joint structure according to claim 1, wherein a thickness of the different material in the plate thickness direction of the incident region is equal to the length of the first gap.

3. The joint structure according to claim 1, wherein the incident region in which laser light is incident in the plate thickness direction is smaller than the penetrating part, and a second gap is provided between the incident region and the penetrating part.

4. The joint structure according to claim 3, wherein the different material is a nonferrous metal, and the second gap has a length not less than 125% of the length of the first gap.

5. The joint structure according to claim 1, wherein a spacer is disposed in the penetrating part of the different material, and the spacer is made of a material weldable to the first material and the second material.

6. A joint structure comprising:
a first material of metal;
a second material of metal weldable to the first material; and a different material including a penetrating part, the different material being sandwiched between the first material and the second material, the different material being different from the first material and the second material and being difficult to weld to the first material and the second material, wherein the different material is compressed between the first material and the second material and is fixed to the first material and second material, and the first material is bonded to the second material via the penetrating part by fusion bonding that is caused by laser light which is incident to the first material under conditions in which:

(i) the first material is disposed on a side on which the laser light is incident in a plate thickness direction of an incident region of the first material, the incident region being a region in which the laser light emitted toward the penetrating part is incident;

(ii) a first gap is provided between the first material and the second material in the plate thickness direction before welding; and (iii) the first gap having a length in the plate thickness direction, the length of the first gap being determined in relation to a plate thickness of the first material, wherein the length of the first gap in the incident region is not less than 6% and not more than 38% of the plate thickness of the first material in the incident region, wherein the incident region in which laser light is incident in the plate thickness direction is smaller than the penetrating part, a second gap is provided between the incident region and the penetrating part, and wherein the different material is a resin, and the second gap has a length not less than 200% of the length of the first gap.

7. A joint structure comprising:
a first material of metal;
a second material of metal weldable to the first material; and a different material including a penetrating part, the different material being sandwiched between the first material and the second material, the different material being different from the first material and the second material and being difficult to weld to the first material and the second material, wherein the different material is compressed between the first material and the second material and is fixed to the first material and second material, and the first material is bonded to the second material via the penetrating part by fusion bonding that is caused by laser light which is incident to the first material under conditions in which:

(i) the first material is disposed on a side on which the laser light is incident in a plate thickness direction of an incident region of the first material, the incident region being a region in which the laser light emitted toward the penetrating part is incident;

(ii) a first gap is provided between the first material and the second material in the plate thickness direction before welding; and (iii) the first gap having a length in the plate thickness direction, the length of the first gap being determined in relation to a plate thickness of the first material, wherein the length of the first gap in the incident region is not less than 6% and not more than 38% of the plate thickness of the first material in the incident region, wherein the incident region in which laser light is incident in the plate thickness direction is smaller than the penetrating part, a second gap is provided between the incident region and the penetrating part, and wherein the different material is a fiber-reinforced resin, and the second gap has a length not less than 150% of the length of the first gap.

8. A joint structure comprising:
a first material of metal;
a second material of metal weldable to the first material; and a different material including a penetrating part, the different material being sandwiched between the first material and the second material, the different material being different from the first material and the second material and being difficult to weld to the first material and the second material, wherein the different material is compressed between the first material and the second material and is fixed to the first material and second material, and the first material is bonded to the second material via the penetrating part by fusion bonding, the different material flows and clings to an outer edge of a weld part at which the first material and the second material are fused and bonded together, the fusion bonding is caused by laser light which is incident to the first material under conditions in which:

(i) the first material is disposed on a side on which the laser light is incident in a plate thickness direction of an incident region of the first material, the incident region being a region in which the laser light emitted toward the penetrating part is incident; and (ii) a first gap is provided between the first material and the second material in the plate thickness direction before welding, wherein the different material is a resin material, and a second gap is provided between the incident region and the penetrating part.

\* \* \* \* \*